United States Patent
Nagasubramaniam et al.

(10) Patent No.: US 10,484,472 B2
(45) Date of Patent: Nov. 19, 2019

(54) METHODS AND SYSTEMS FOR EFFICIENTLY MOVING DATA BETWEEN NODES IN A CLUSTER

(71) Applicant: NETAPP, INC., Sunnyvale, CA (US)

(72) Inventors: Balajee Nagasubramaniam, Sunnyvale, CA (US); Subin Govind, Sunnyvale, CA (US); Vijay Singh, Sunnyvale, CA (US); Jeff Prem, Pittsburgh, PA (US)

(73) Assignee: NETAPP, INC., Sunnyvale, CA (US)

( * ) Notice: Subject to any disclaimer, the term of this patent is extended or adjusted under 35 U.S.C. 154(b) by 597 days.

(21) Appl. No.: 14/840,512

(22) Filed: Aug. 31, 2015

(65) Prior Publication Data
US 2017/0034269 A1    Feb. 2, 2017

Related U.S. Application Data

(60) Provisional application No. 62/199,633, filed on Jul. 31, 2015.

(51) Int. Cl.
| | | |
|---|---|---|
| *G06F 15/16* | (2006.01) | |
| *G06F 7/00* | (2006.01) | |
| *H04L 29/08* | (2006.01) | |
| *H04L 29/06* | (2006.01) | |
| *H04L 12/26* | (2006.01) | |
| *G06F 15/167* | (2006.01) | |

(52) U.S. Cl.
CPC ........ *H04L 67/1097* (2013.01); *G06F 15/167* (2013.01); *H04L 43/16* (2013.01); *H04L 69/16* (2013.01); *H04L 69/161* (2013.01); *H04L 69/18* (2013.01)

(58) Field of Classification Search
CPC ..... H04L 67/1097; H04L 69/16; H04L 43/16; H04L 69/18; H04L 69/161; G06F 15/167
USPC ......................................................... 709/212
See application file for complete search history.

(56) References Cited

U.S. PATENT DOCUMENTS

| | | | | |
|---|---|---|---|---|
| 6,922,408 B2 * | 7/2005 | Bloch | ................. | H04L 12/4604 370/389 |
| 7,877,511 B1 * | 1/2011 | Berger | .................... | H04L 67/16 709/242 |
| 8,688,798 B1 * | 4/2014 | Lentini | ............... | H04L 67/1097 709/212 |
| 9,182,918 B2 * | 11/2015 | Jibbe | ....................... | G06F 3/061 |

(Continued)

*Primary Examiner* — Kevin T Bates
*Assistant Examiner* — Golam Mahmud
(74) *Attorney, Agent, or Firm* — Cooper Legal Group, LLC

(57) ABSTRACT

Exemplary embodiments provide methods, mediums, and systems for efficiently moving data between cluster nodes. Upon receiving a request to read or write data at a first cluster node that is in communication with a client, the first node effects the transfer to or from a second cluster node. The transfer is carried out using a combination of remote data memory access ("RDMA"), or a similar technique that bypasses a part of the network stack, and transport control protocol ("TCP"), or a similar technique that does not bypass a part of the network stack. The data is transferred using RDMA, while certain control messages are sent using TCP. By combining RDMA content transfers and TCP control messages, data transfers can be carried out faster, more efficiently, and with less processing overhead. Other embodiments are described and claimed.

20 Claims, 14 Drawing Sheets

(56) References Cited

U.S. PATENT DOCUMENTS

| | | | |
|---|---|---|---|
| 9,367,245 B2 * | 6/2016 | Sangapu | G06F 3/061 |
| 9,639,437 B2 * | 5/2017 | Hildebrand | G06F 3/0617 |
| 2002/0026502 A1 * | 2/2002 | Phillips | H04L 29/06 709/219 |
| 2005/0234985 A1 * | 10/2005 | Gordon | G11B 27/105 |
| 2006/0047771 A1 * | 3/2006 | Blackmore | H04L 67/1097 709/209 |
| 2010/0114889 A1 * | 5/2010 | Rabii | G06F 16/1824 707/737 |
| 2013/0226888 A1 * | 8/2013 | Govind | G06F 16/172 707/698 |
| 2014/0094210 A1 | 4/2014 | Gellens et al. | |

* cited by examiner

METHODS AND SYSTEMS FOR EFFICIENTLY MOVING DATA BETWEEN NODES IN A CLUSTER

CROSS-REFERENCE TO RELATED APPLICATIONS

This application claims priority to, and benefit of, U.S. Provisional Patent Application Ser. No. 62/199,633, entitled "Methods and Systems for Efficiently Moving Data between Nodes in a Cluster," filed on Jul. 31, 2015, the subject matter of which is hereby incorporated by reference in its entirety.

BACKGROUND

Computing devices may be organized into clusters that provide services to an accessing computing device, known as a client. Devices that make up the cluster are referred to as nodes of the cluster. The present application is addressed to the problem of efficiently moving data between the nodes of a cluster.

DETAILED DESCRIPTION

Figure 1:
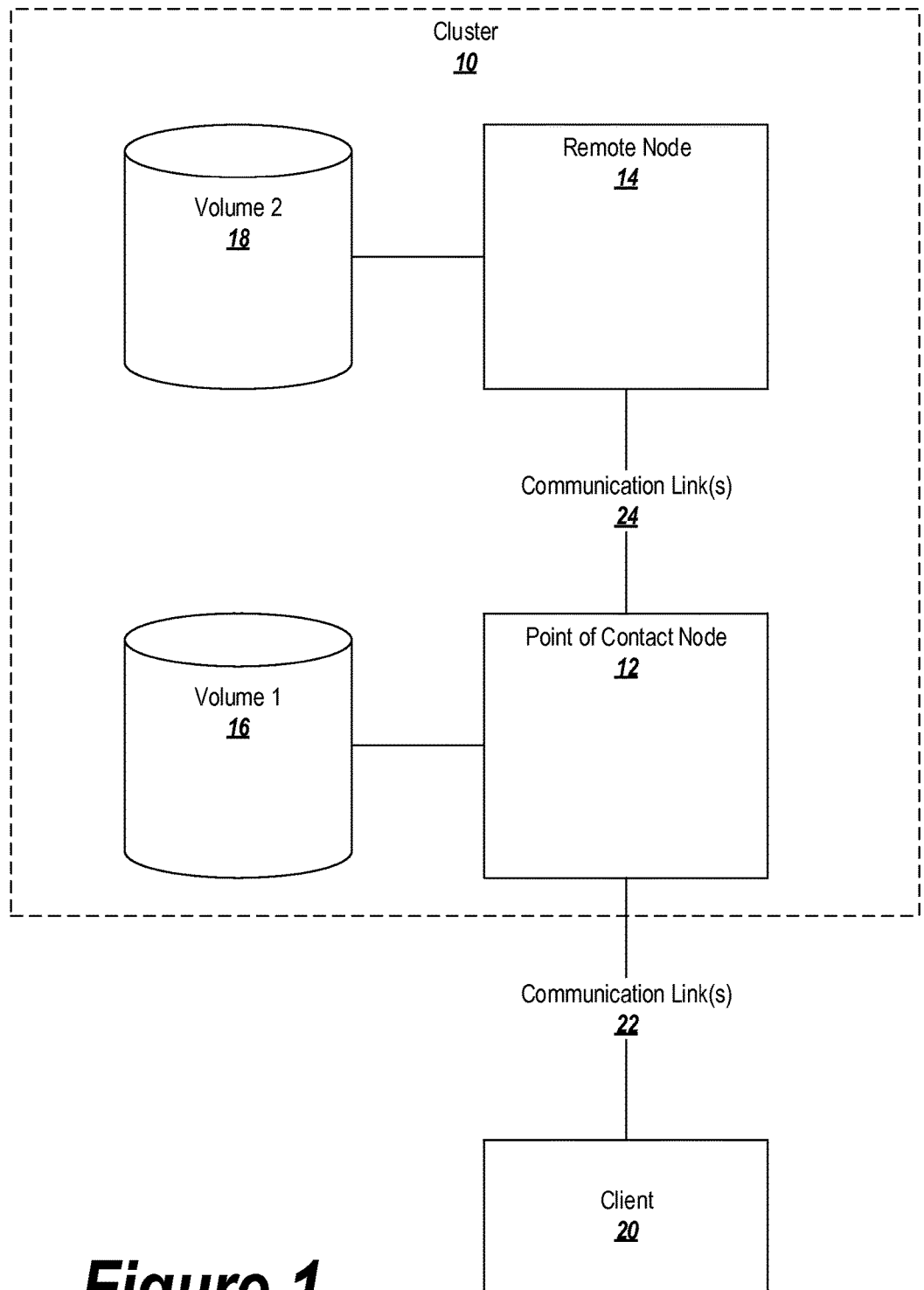
FIG. 1 is a block diagram depicting an example of a system including a cluster and a client device suitable for use with exemplary embodiments described herein.

Computing devices may be organized into clusters that provide services to an accessing computing device, known as a client. Devices that make up the cluster are referred to as nodes of the cluster. Although the cluster may be made up of multiple distinct nodes, it may be presented to the client as a single entity. The client may be assigned to interact with a particular node of the cluster, or may interact with whichever node is most convenient. The node with which the client interacts is referred to herein as the point of contact (PoC) node for cluster. The client contacts the PoC node with requests for different services, and the PoC node contacts other nodes that may be needed for the requested service and abstracts away the internal cluster interactions so that the client is presented with a unified experience.

One such service that the cluster may provide is data storage. A client may access data in the cluster through input/output ("I/O") requests, such as requests to read data from a storage system in the cluster, or write data to a storage system in the cluster.

Although the client interacts with the PoC node in the cluster, the client may send a request to read data that is stored on a storage volume that is located remotely from the PoC node. In another example, the client may request that data be stored in the cluster (a "write" request), and the PoC or a cluster administrator may determine that the data should be stored on a storage volume remote from the PoC node.

In these cases, the PoC node may manage interactions between the client and the remote storage volume. For example, the PoC node may send data to a remote node associated with the storage volume so that the remote node can write the data to the storage volume. Alternatively or in addition, the PoC node may forward a read request to the remote node when a client requests data stored on a volume associated with the remote node, and may relay the retrieved data back to the client.

Exemplary embodiments provide methods, mediums, and systems for efficiently moving data between cluster nodes. Upon receiving a request to read or write data at a first cluster node that is in communication with a client, the first node effects the transfer to or from a second cluster node. The transfer is carried out using a combination of remote data memory access ("RDMA"), or a similar technique that bypasses a part of the network stack, and transport control protocol ("TCP"), or a similar technique that does not bypass a part of the network stack. The data is transferred using RDMA, while certain control messages and metadata are sent using established TCP communication paths. The RDMA portion of the technique is performed in a counter-intuitive manner: in order to write data, an RDMA read command is issued, and in order to read data, an RDMA write command is issued.

Such an approach has advantages over alternative options. As compared to using a TCP-only method of data transfer, exemplary embodiments conserve processing resources by avoiding the need to perform network overhead operations associated with the bypassed portions of the network stack. For example, in conventional TCP-based data transfers, a chain of buffers is allocated as the data moves through the network stack. At various protocol layers, the stack may be locked, and latency may be incurred due to protocol-based flow control.

As compared to using an RDMA-only approach in which both the data and control messages are sent using RDMA, exemplary embodiments avoid the need to provide an out-of-bound mechanism to cause the receiving node to act on the data. Because RDMA is a one-sided communication, RDMA does not notify the recipient that the data transfer has been completed. Thus, in an RDMA-only approach, RDMA control messages must be implemented in conjunction with an out-of-band mechanism that causes the recipient node to act appropriately in response to the loaded data (which is inefficient), or some type of polling (which consumes processing resources and network resources). Such an out-ofband mechanism or polling-based solution can be avoided by employing the exemplary embodiments described.

Moreover, it cannot necessarily be guaranteed that all nodes in the cluster will implement RDMA. Even if RDMA is implemented on a node, the RDMA communication pathways may become constrained, thus rendering it difficult or impossible to transfer data using RDMA. By providing a system that uses a combination of RDMA and TCP, the data transfer can be effectuated by TCP if RDMA is unavailable.

For illustration purposes, an exemplary environment and apparatus in which exemplary embodiments may be employed are next described with reference to FIGS. 1 and 2.

Overall System and Environment

FIG. 1 depicts an example of a cluster 10 containing two nodes: a point of contact node 12 and a remote node 14. A node refers to an electronic device that provides services, such as data storage or processing, on behalf of the cluster. Although two nodes are depicted for ease of discussion, a cluster 10 may be made up of any number of nodes. As shown in FIG. 1, each node 12, 14 is associated with a storage volume 16, 18 (respectively). The storage volumes 16, 18 store data on behalf of their associated nodes 12, 14.

The cluster 10 is presented to outside users, such as the client 20, as a unitary entity. That is, the client 20 interacts with the cluster 10 as though the cluster 10 were a single device, even though the cluster is made up of multiple devices. This allows the client 20 to benefit from the services provided by the nodes of the cluster 10, without needing to know the internal structure or workings of the cluster 10.

In order to send tasks to the cluster 10 and receive results from the cluster 10, the client 20 communicates with one of the nodes of the cluster (the point of contact node 12) using one or more communication links 22. The communication links 22 may be, for example, TCP communication links.

Although the client 20 communicates directly with the point of contact node 12, it is not necessarily the case that the client 20 will request that the cluster 10 perform a task that will be handled by the point of contact node 12. For example, a load balancer in the cluster 10 may determine that the task should be handled by the remote node 14. Alternatively or in addition, the client 20 may request data from the cluster 10 that is stored on the storage volume 18 associated with the remote node 14. In order to perform the task or retrieve the data, the point of contact node 12 may communicate with the remote node 14 using one or more intra-cluster communication links 24. The intra-cluster communication links 24 may be, for example, TCP communication links or RDMA communication links.

Figure 2:
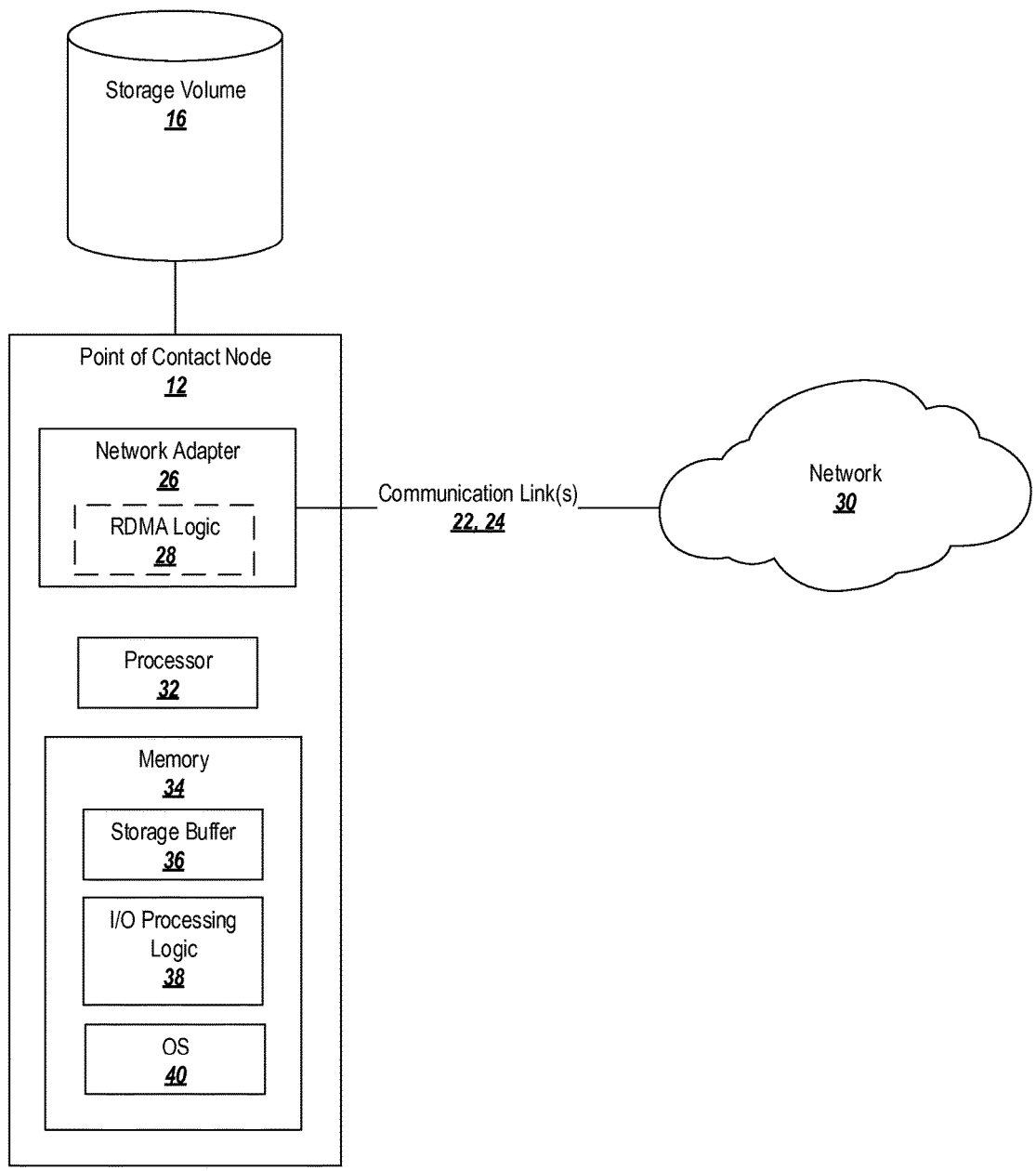
FIG. 2 is a block diagram depicting an exemplary electronic computing device.

FIG. 2 depicts an example of an electronic device suitable for use as a node in the cluster 10. For purposes of discussion, a point of contact node 12 is depicted in FIG. 2, although a similar device having similar components may be used as a remote node 14 or a client 20.

As noted above with respect to FIG. 1, the point of contact node 12 may be associated with a storage volume 16. The storage volume 16 may be integrated with the point of contact node 12 or may be communicatively coupled to point of contact node 12. The point of contact node 12 may be configured to perform read and write operations on the storage volume 16 by sending appropriate read or write commands to the storage volume 16. Examples of storage volumes 16 include partitions on hard disk drives (HDD and solid state drives (SSD). The storage volume 16 may include one or several physical drives, and may be arranged into a redundant array of independent disks (RAID) arrangement.

The point of contact node 12 may include a network adapter 26 for communicating using the communication links 22, 24. The network adapter 26 may be, for example, a wired adapter such as a network interface controller for establishing a wired connection to a computer network, a fiber optic interface for connecting to a fiber optic network, a cable interface for connecting to a cable television network, a telephone jack for connecting to a telephone network, or a power-line interface for connecting to a power-line communications network. Alternatively or in addition, the network adapter 26 may be a wireless adapter such as a radio transmitter/receiver that modulates and demodulates electromagnetic signals. Examples of wireless network adapters 26 include devices communicating through short-wavelength ultra-high frequency (UHF) radio waves.

The network adapter 26 may optionally be configured with RDMA logic 28 for communicating using the RDMA protocol. By configuring the network adapter 26 with RDMA logic, the network adapter 26 may be capable of reading data from, and writing data to, other devices in the cluster 10 without using the processor 32 or the operating system 40.

The point of contact node 12 may use the network adapter 26 to communicate with other devices via a network 30. The network 30 may be a public network such as the Internet, or a private network such as a private Data ONTAP® network provided by NetApp, Inc. of Sunnyvale, Calif.

The point of contact node 12 may include a processor 32 for performing mathematical and/or logical operations on behalf of the point of contact node 12. The processor 32 may be a Central Processing Unit (CPU) having one or more processing cores, one or more coprocessors, and/or on-chip cache. Examples of processors 32 include the Celeron®, Pentium®, Core™, and Atom™ families of processors from Intel Corporation of Santa Clara, Calif., the Accelerated Processing Unit (APU) and Central Processing Unit (CPU) processors from Advanced Micro Devices (AMD), Inc. of Sunnyvale, Calif., the Snapdragon™ family of processors from Qualcomm Technologies, Inc. of San Diego Calif., and the Cortex® family of processors from ARM Holdings, PLC of Cambridge, England.

The point of contact node 12 may include a memory 34 for holding data, instructions, and other information for use by the other components of the point of contact node 12. The memory 34 may be a non-transitory computer readable medium. For example, the memory 34 may be solid-state storage media such as flash memory and/or random access memory (RAM).

The memory 34 may include a storage buffer 36 for temporarily storing data until the data can be processed by the processor 32 or transmitted using the network adapter 26. The storage buffer 36 may be, for example, a designated region in the memory 34 and may be embodied as a circular buffer. The processor 32 or the RDMA logic 28 may allocate space in the memory 34 to serve as a storage buffer 36, and may deallocate the space occupied by the storage buffer 36 when the storage buffer 36 is no longer needed in order to conserve memory resources.

The memory 34 may be configured with Input/Output ("I/O") processing logic 38. The I/O processing logic may include instructions that, when executed by the processor 32, cause the processor 32 to perform any of the methods described herein. For example, the processing logic 38 may implement any of the functionality or capabilities depicted in FIGS. 4-10B.

The memory 34 may also store an operating system 40 for controlling the point of contact node 12. Examples of operating systems 40 include the Windows® family of operating systems by Microsoft, Inc. of Redmond, Wash., or the Data ONTAP® operating system by NetApp, Inc. of Sunnyvale, Calif.

The environment and apparatuses of FIGS. 1 and 2 may be used to implement the exemplary embodiments described herein. As noted above, these embodiments make use of a combination of RDMA and TCP (or similar protocols) and carry advantages over possible alternative approaches relying on RDMA or TCP alone. To better illustrate the advantages of the exemplary embodiments, comparative examples employing TCP and RDMA alone are next described with reference to FIGS. 3A-3C. In the examples that follow, numbers in parentheses refer to steps as illustrated in the respective Figures, although it is noted that steps may be performed in a different order in some circumstances.

Comparative Examples

Figure 3A:
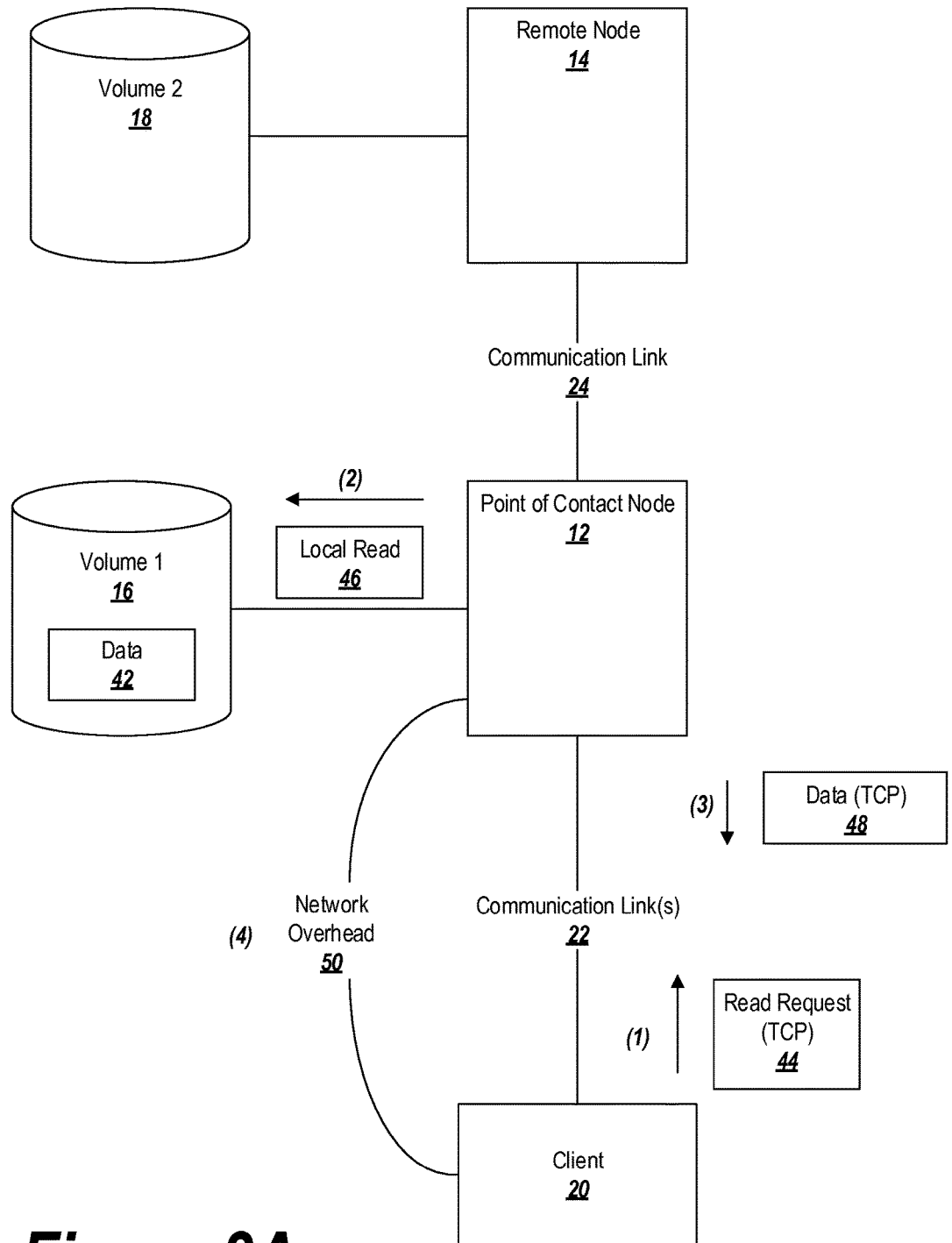
FIG. 3A is a block diagram depicting a comparative example of a local read performed in the system of FIG. 1.

FIG. 3A is a block diagram depicting an example of a local read in the cluster. A local read occurs when the client 20 requests access to data 42 that is stored on the storage volume 16 that is locally accessible to the point of contact node 12. This is usually the most efficient way to access the data 42, because the data 42 does not need to be transferred among the nodes of the cluster.

First (1), the client 20 formulates a read request 44 and sends the read request to the point of contact node 12 over a communication link 22 that implements TCP. The point of contact node 12 receives the request and performs (2) a local read operation 46 to retrieve the data 42 from the local storage volume 16. After retrieving the data 42 from the local storage volume 16, the point of contact node 12 transmits (3) the requested data in the form of TCP data packets 48 at step.

In order to effect the transfer of the data according to TCP, some amount of network overhead 50 is incurred (4). When the data 42 is received at the point of contact node 12, the data is processed according to a series of steps referred to as a network protocol stack. These steps may involve a series of actions performed by the network adapter 26, by software applications run by the point of contact node 12, and by the operating system 40, among other possibilities. The network stack is typically divided into multiple layers; for example, the popular Open Systems Interconnection ("OSI") model of computer networking involves seven layers, from the low-level actions performed by the physical transmission links to the high level operations performed by the operating system and individual software applications running on the operating system. The network overhead 50 may involve the allocation of one or more storage buffers 36 at different layers of the protocol stack, and the use of resources of the processor 32 to prepare the data at each layer and ensure that the data has been successfully received, among other possibilities.

The amount of network overhead 50 involved is partially dependent on the size of the maximum transmission unit (MTU) associated with the communication links 22, which defines the maximum allowable size of data units that are placed onto the communication links 22. Typically, data for transmission on a network is broken down into smaller units called packets. The size of each packet is dictated by the MTU of the communication links 22 over which the data is sent. For example, if the data 42 is 4000 bytes in size, but the MTU of the communication links 22 is 1500 bytes, then the data 42 will need to be broken down into at least three packets. If the communication links 12 have a relatively small MTU (meaning that only a relatively small amount of data can be encoded into each packet), then the point of contact node 12 may need to break the data 42 into relatively more packets than if the MTU were larger. The transmission of each packet incurs a certain amount of network overhead 50, which means that the network overhead 50 will scale up as the MTU is made smaller. Some of the network overhead 50 is inherent to any transmission of the data, while some is due to actions performed as part of the TCP protocol.

In the local read technique depicted in FIG. 3A, the network overhead 50 associated with the use of TCP is only incurred once, in the transmission of the data from the point of contact node 12 to the client 20. However, when the data 42 is not located on the local storage volume 16 associated with the point of contact node, the network overhead 50 is compounded.

Figure 3B:
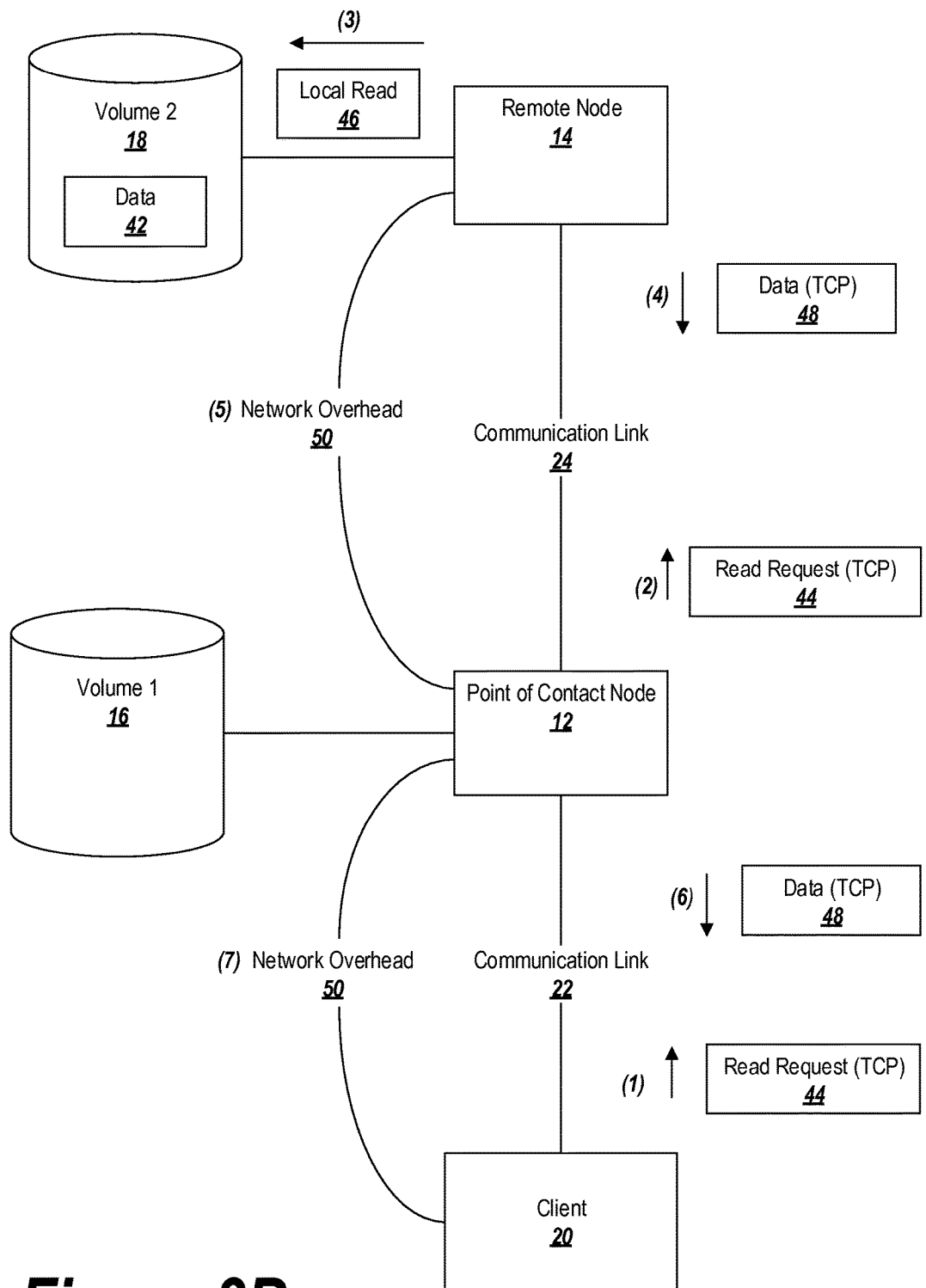
FIG. 3B is a block diagram depicting a comparative example of a remote read performed using TCP in the system of FIG. 1.

For example, consider the example depicted in FIG. 3B, in which the data 42 is stored on the storage volume 18 associated with the remote node 14. This is referred to as a remote read.

In the example depicted in FIG. 3B, the remote read is implemented solely with TCP. First (1), a read request is transmitted from the client 20 to the point of contact node 12 over the communication link 22. Upon determining that the requested data is not located at the local storage volume 16, but rather is located at a remote storage volume 18, the point of contact node 12 generates an internal read request 44 and (2) transmits the read request to the remote node 14. The remote node 14 performs (3) a local read operation 46 to retrieve the data 42 from the storage volume 18 associated with the remote node 14. The remote node 14 then transmits (4) the requested data back to the point of contact node 12 using as a series of TCP packets 48. This step incurs (5) network overhead 50 associated with the use of TCP.

Upon receiving the data 42 from the remote node, the point of contact node 12 transmits (6) the data back to the client over the communication link 22 as a series of TCP packets 48. This step also incurs (7) network overhead 50 associated with the use of TCP.

As can be seen from this example, performing a remote read doubles the amount of network overhead 50 incurred as a result of the use of TCP, as compared to the local read of FIG. 3A. FIG. 3B depicts a relatively simple example in which the point of contact node 12 is able to directly contact the remote node 14, but this will not necessarily occur in all situations. In some circumstances, it may be necessary to communicate with one or more intermediate nodes in order to reach the remote node 14. At each "hop" in the network, the amount of network overhead 50 is increased.

Figure 3C:
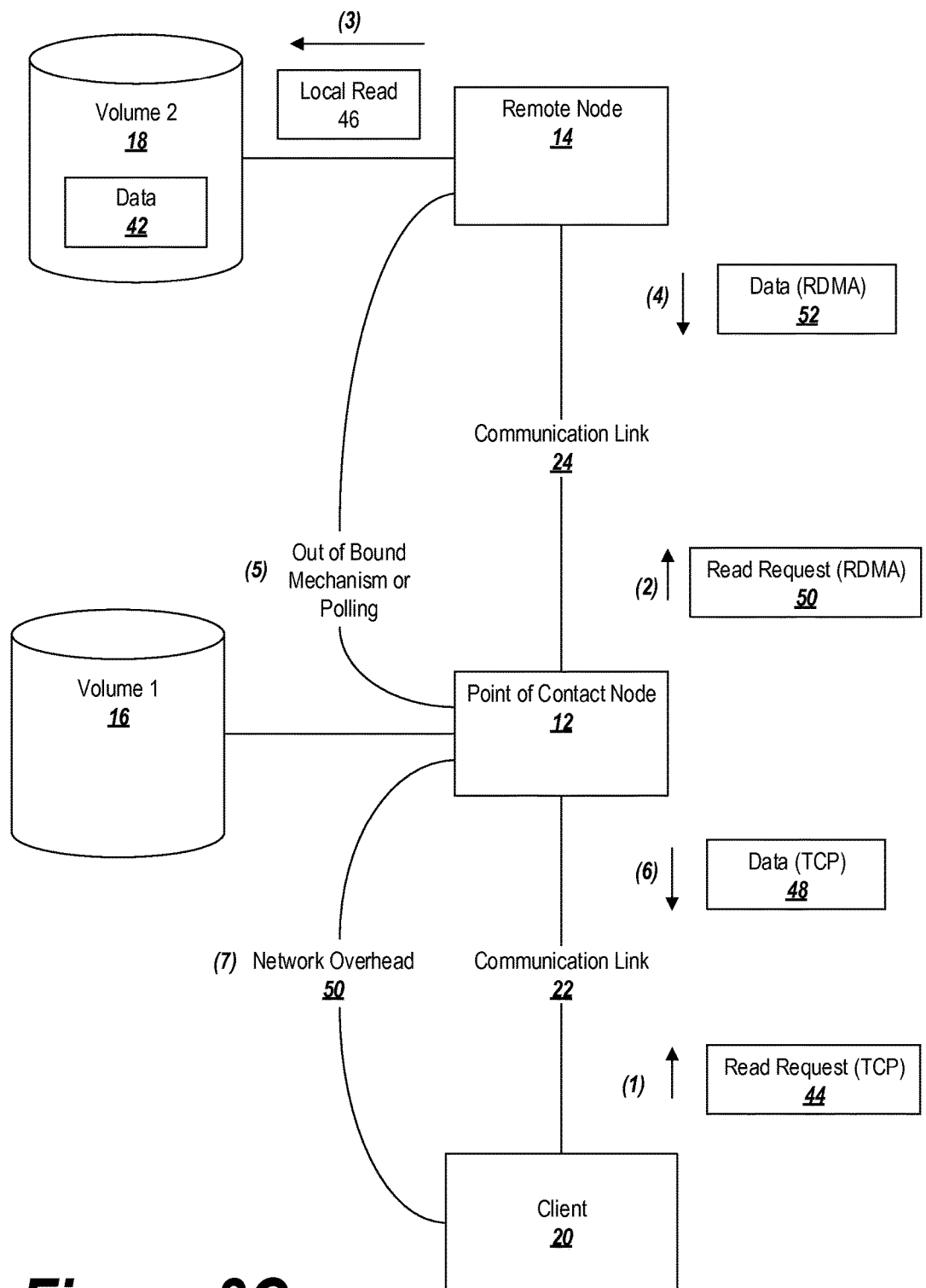
FIG. 3C is a block diagram depicting a comparative example of a remote read performed using RDMA in the system of FIG. 1.

As an alternative, data may be transferred between nodes in the cluster using RDMA, which allows the network overhead 50 associated with the use of TCP to be avoided. This is because RDMA reads and writes data directly from/to remote memory, without the need to involve the operating system 40 of the node associated with the remote storage volume. FIG. 3C depicts an example of a remote read performed using RDMA alone (within the cluster, as the client 20 typically communicates with the cluster using TCP).

The client 20 formulates a read request 44 and transmits (1) the read request 44 to the point of contact node 12 using TCP. The point of contact node 12 determines that the requested data is not located on the local storage volume 16, but rather is located at a remote storage volume 18. The point of contact node then formulates a read request and transmits (2) the request to the remote node 14 using RDMA. Because the point of contact node 12 may not know the memory location on the remote storage volume 18 at which the data is stored, this step (2) may involve additional overhead. For example, the point of contact node 12 may issue out of bound RDMA messages that inquire where the data is located, and the remote node 14 may respond with out of bound RDMA messages providing the address of the data. At that point, the point of contact node 12 may issue an RDMA read request 50 to read the data at the identified address.

Upon receiving an RDMA read request 50, the network adapter 26 of the remote node 14 recognizes the RDMA read request and bypasses some of the layers of the network stack. The remote node 14 retrieves (3) the data 42 from the storage volume 18, and places (4) the data 42 directly into the memory 34 of the point of contact node 12 using an RDMA data transfer 52. This RDMA transfer also avoids some layers of the network stack at the point of contact node 12.

Problematically, RDMA does not provide any mechanism to notify the recipient of data (the point of contact node 12, in this case) that the transfer has been completed. Accordingly, the point of contact node 12 and/or the remote node 14 must implement (5) some sort of out of bound mechanism. An out of band mechanism is a mechanism that operates on top of, or in addition to, the RDMA messages that actually effect the transfer. For example, custom RDMA send/receive messages could be used to inform the point of contact node 12 that the RDMA transfer has been completed. This typically requires additional messages beyond those required to effect the data transfer, and may also require custom logic on the point of contact node 12 that recognizes the out of bound messages and causes the point of contact node 12 to take appropriate actions in response. Because each RDMA operation requires an out of band follow-up message, the advantages of using RDMA are diminished.

Alternatively, after sending the RDMA read request 50 in the second step, the point of contact node 12 could begin polling the remote node 14 to ask whether the transfer had been completed. This solution is relatively inefficient, however, due to the processing and network resources that are used in the polling.

Upon learning that the data 42 has been loaded into the memory 34 of the point of contact node 12, the point of contact node 12 transmits (6) the data back to the client over the communication link 22 as a series of TCP packets 48. This step incurs (7) network overhead 50 associated with the use of TCP.

The benefit to this arrangement is that network overhead 50 associated with the use of TCP is not incurred in intra-cluster communications. It has the disadvantage, however, of requiring the above-noted out of bound or polling mechanism.

Next, consider a similar example (not illustrated for brevity) where the client 20 requests that data be written to the volume 18 associated with the remote node 14. In this case, the point of contact node 12 could inform the remote node 14 that a write request was imminent using an out of bound RDMA message. The remote node 14 could allocate a buffer at the remote node 14 and send out of bound RDMA message informing the point of contact node 12 of the address where the buffer is located. The point of contact node 12 could then perform and RDMA write command and write the data to the remote node's buffer. Once the transfer is complete, the point of contact node 12 would need to inform the remote node 14, again using an out of bound RDMA message (or by employing a polling mechanism), that the information has been transferred and that the remote node 14 should take appropriate steps to write the transferred data to the volume 18 associated with the remote node 14.

As can be seen in these examples, each transfer involves the use of a number of out of bound messages, polling, or both. As compared to these examples, embodiments of the present invention use RDMA to effect the transfer of data content in a unique way, along with TCP to effect the transfer of metadata and control messages. This has the advantage of avoiding much of the intra-cluster network overhead associated with the use of TCP, while also avoiding the need to deploy an out of bound or polling mechanism to determine when a transfer has completed.

Exemplary Embodiments

Figure 4:
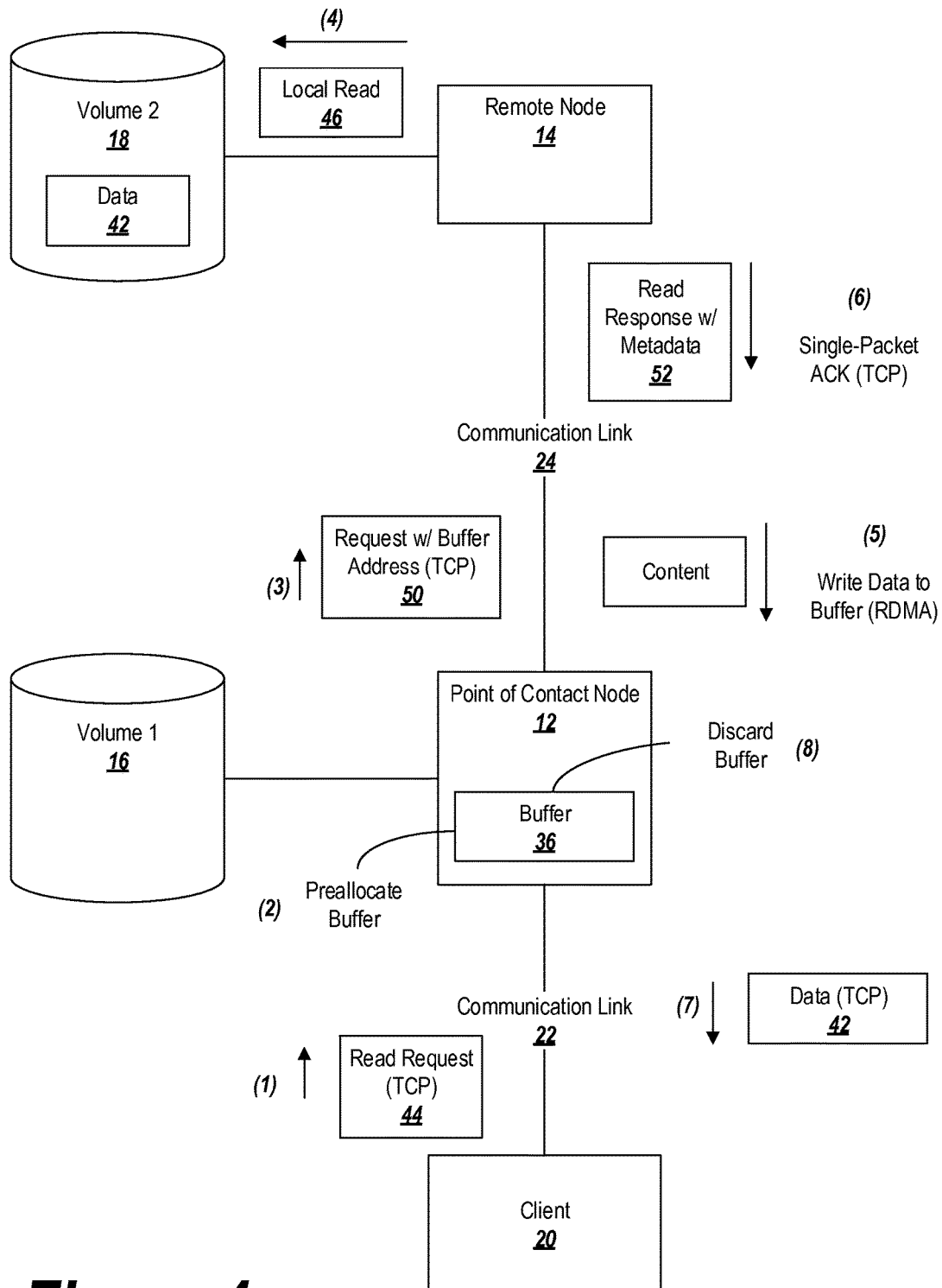
FIG. 4 is a block diagram depicting an example of a remote read performed according to an exemplary embodiment.

FIG. 4 provides an example of a read operation performed according to an exemplary embodiment. First, the client 20 issues (1) a read request 44 to the point of contact node 12 using TCP. The read request 44 requests that data 42 that is stored on a volume 18 associated with a remote node 14 be returned to the client 20.

In response to receiving the read request 44, the point of contact node preallocates (2) a buffer 36 to hold the data 42. The point of contact node 12 then sends (3), via TCP, a request 50 to the remote node. The request 50 includes the address of the buffer. Because the buffer address is relatively small, the request 50 can usually be transmitted as a single TCP packet, which limits the amount of TCP overhead associated with this step.

Upon receiving the request, the remote node 14 performs (4) a local read operation 46 to retrieve the data 42 from the volume 18. The data 42 typically includes content and metadata. The remote node 14 separates the content from the metadata.

In the comparative example depicted in FIG. 3C, all of the data 42, including the content and the metadata, would be transferred using RDMA, and additional control messages would be sent to confirm that the data 42 had been transferred. In contrast, in the exemplary embodiment depicted in FIG. 4, the remote node 14 retrieves the buffer address from the previously-received TCP request 50, and uses an RDMA write operation to write (5) the content of the data 42 directly to the buffer 36 of the point of contact node 12. The metadata from the data 42 is then loaded into a response message 52, which is sent (6) via TCP to the point of contact node 12. Because metadata is typically relatively small compared to the content of the data 42, the metadata can often be transmitted as a single TCP packet (or at least relatively few TCP packets, if the metadata were to exceed the MTU of the communication link 24). This single TCP packet serves as an acknowledgement that the data has been transferred via RDMA, and therefore provides both confirmation and the metadata that is necessary for reconstructing the data 42, without the need to resort to an out of bound mechanism or polling mechanism.

Upon receiving the read response 52, the point of contact node 12 reconstructs the data 42 by combining the content received via RDMA with the metadata received via TCP. The data 42 is then returned (7) to the client 20 via TCP. Once the data is transferred, the point of contact node 12 can safely deallocate (8) the buffer 36.

Using this technique, the intra-cluster network overhead is extremely limited (only two TCP packets, at steps 3 and 6 in this example), thus addressing the problems inherent in the TCP-only approach. Moreover, no out of band mechanism or polling mechanism needs to be employed, thus addressing the problems with the RDMA-only approach.

Figure 5:
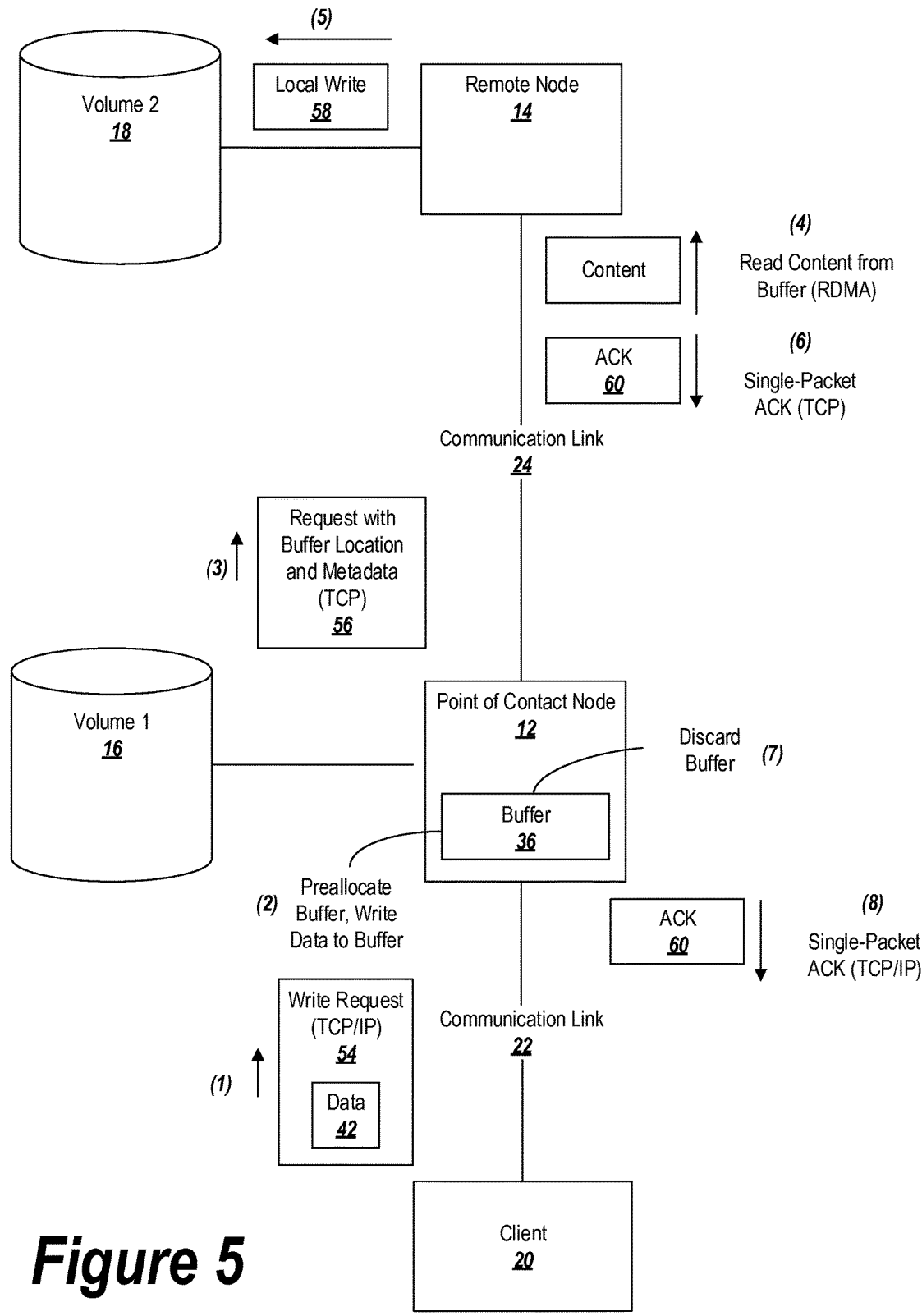
FIG. 5 is a block diagram depicting an example of a remote write performed according to an exemplary embodiment.

A similar idea can be employed in the case of a remote write, as shown in FIG. 5. The client 20 issues (1) a write request 54 containing data 42 to be written to the volume 18 associated with the remote node 14. The write request 54 is sent to the point of contact node 12 using TCP.

In response to receiving the write request 54, the point of contact node 12 preallocates (2) a buffer 36. The point of contact node 12 separates the content of the data 42 from the metadata of the data 42, and loads the content into the buffer 36. The point of contact node 12 then sends (3) a request 56 that includes the address of the buffer 36 to the remote node 14 via TCP. The request 56 also includes the metadata from the data 42. Because the address of the buffer 36 and the metadata are relatively small, this step can typically be achieved by sending a single TCP packet, or relatively few TCP packets.

The remote node 14 receives the request 56 and retrieves the location of the buffer 36. The remote node then issues (4) an RDMA read command to read the content from the buffer 36. Once the content is received at the remote node 14, the remote node 14 reconstructs the data 42 by combining the metadata received in the request 56 with the content retrieved in step (4). The remote node 14 then performs (5) a local write operation 58 to write the data 42 to the volume 18 associated with the remote node 14.

Once the remote node 14 has finished writing the data, the remote node 14 sends (6) an acknowledgement 60 of success to the point of contact node 12 using TCP. Because the acknowledgement 60 is relatively small, this can typically be achieved using a single packet.

Upon receiving the acknowledgement 60, the point of contact node deallocates (7) the buffer 36, and sends (8) an acknowledgement 60 to the client 20 to inform the client 20 that the write operation has been carried out successfully.

A particular implementation of these exemplary embodiments is next described, using TCP for control message and metadata transmissions, and the SpinNP protocol of the NetApp, Inc. for RDMA communications. Although particular data structures and protocols are described in connection with FIGS. 6A-10B, these examples are provided for illustration only. The present invention is not limited to the specific examples provided herein.

Example Implementation

FIGS. 6A-6D depict exemplary data structures suitable for use in exemplary embodiments.

Figure 6A:
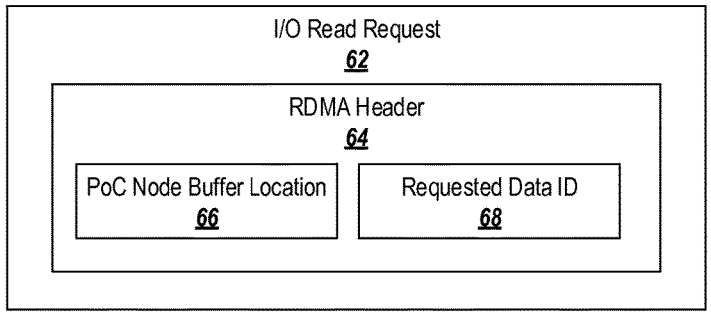
FIGS. 6A-6D depict exemplary data structures suitable for use with exemplary embodiments.

FIG. 6A depicts an exemplary I/O Read Request 62, which may be used (for example) as the request described in step (3) of FIG. 4. The I/O Read Request 62 includes an RDMA header 64 (although the I/O Read Request 62 is transmitted using TCP). Within the RDMA header 64, the I/O Read Request 62 provides a field 66 for identifying the location of the buffer 36 in the memory 34 of the point of contact node 12. The RDMA header 64 also includes a field 68 for providing an identifier of the requested data, such as a file name, ID number, physical address, or some other identifier that informs the remote node which data is being requested.

Figure 6B:
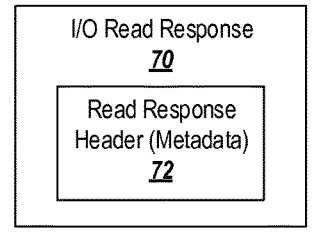

FIG. 6B depicts an exemplary I/O Read Response 70, which may be used (for example) as the read response described in connection with step (6) of FIG. 4. The I/O Read Response 70 includes a Read Response Header 72 which the metadata for the retrieved data 42 is stored. The I/O Read Response 70 is transmitted using TCP.

Figure 6C:
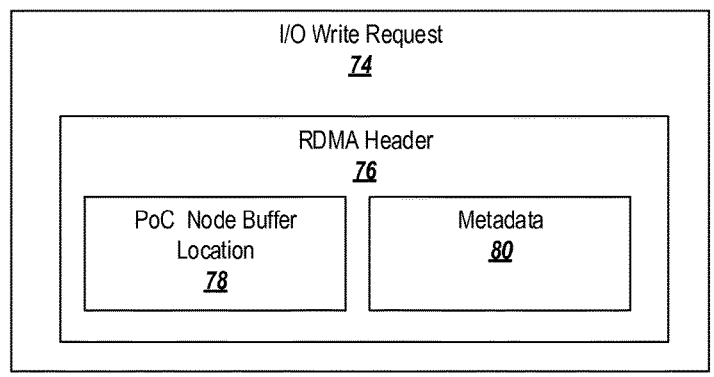

FIG. 6C depicts an exemplary I/O Write Request 74, which may be used (for example) as the Request described in step (3) of FIG. 5. The I/O Write Request 74 includes an RDMA header 76 (although the I/O Write Request 74 is transmitted using TCP). Within the RDMA header 76, the I/O Write Request 74 provides a field 78 for identifying the location of the buffer 36 in the memory 34 of the point of contact node 12. The RDMA header 76 also includes a field 80 for providing the metadata associated with the data 42 that is being written to the remote node 14.

Figure 6D:
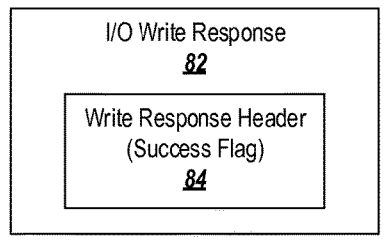

FIG. 6D depicts an exemplary I/O Write Response 82, which may be used (for example) as the acknowledgement 60 described in step (6) of FIG. 5. The I/O Write Response 82 includes a read response header 84 that includes a flag to indicate whether the write operation was successfully carried out.

Figure 7:
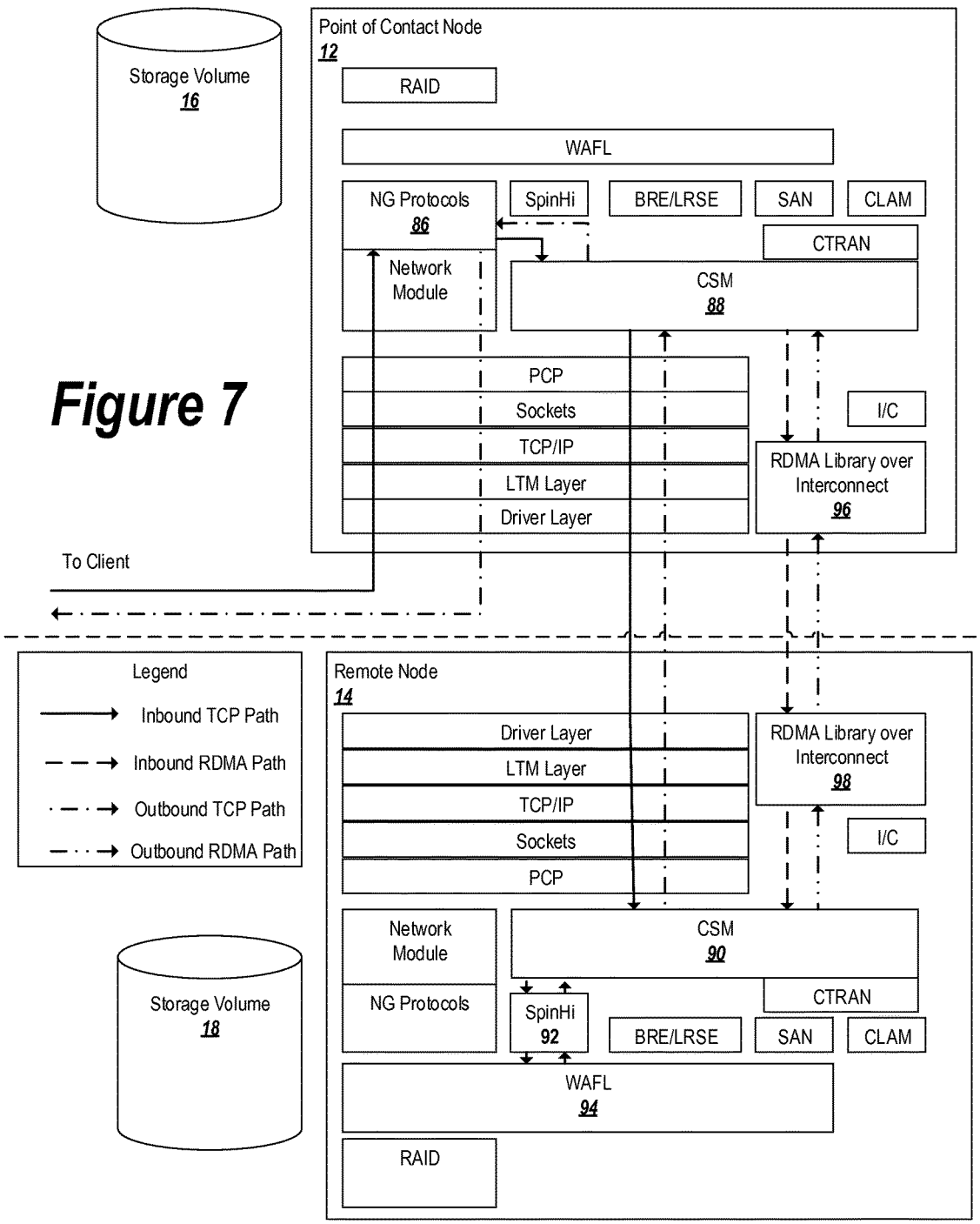
FIG. 7 is a data flow diagram depicting exemplary communication paths in cluster.

The exemplary data structures of FIGS. 6A-6D may be sent over TCP communication paths in the cluster, while data content may be transmitted over RDMA communication paths. Examples of such communication paths are depicted in FIG. 7.

The point of contact node 12 typically communicates with a client using the TCP protocol. TCP messages are received by the point of contact node 12 and pass through several layers of the network stack. These layers include, for example, a drier layer, an LTM layer, a TCP/IP layer, a sockets layer, and a PCP layer. The messages are retrieved by a network module (such as server hardware/software) and processed by an NG protocol 88.

The NG protocol 88 communicates with a cluster session manager (CSM) 88. The CSM 88 of the point of contact node 12 is in communication with a partner CSM 90 on the remote node 14. The CSM 88 and the CSM 90 can communicate with each other using TCP by exchanging messages that traverse the network stack, as illustrated in FIG. 7.

These elements make up the TCP path in the network. Messages described herein as being sent via TCP may be sent along this path.

The CSM 88 may also communicate with its counterpart CSM 90 using RDMA by sending RDMA messages through an interconnect 96. The interconnect 96 establishes an RDMA communications path to a counterpart RDMA interconnect 98 at the remote node 14. The counterpart RDMA interconnect communicates with the CSM 90 of the remote node 14.

These elements make up the RDMA path in the network. Messages described herein as being sent via RDMA may be sent along this path. Notably, the RDMA path avoids the need to traverse much of the network stack, thus reducing the overhead associated with RDMA transmissions.

At the remote node 14, the CSM may cause read and write operations to be performed by forwarding requests to SpinHi logic 92, which in turn communicates with Write Anywhere File Layout (WAFL) logic 94 to read data from, and write data to, the storage volume 18.

Note that communication between the CSM 90, the SpinHi logic 92, and the WAFL logic 94 do not necessarily rely on any particular network communications protocol such as TCP or RDMA. They may communicate with each other using any suitable protocol.

The client 20, the point of contact node 12, and the remote node 14 may be in communication with each other using these communication paths. FIGS. 8-10B describe exemplary methods performed by these entities in order to effect read and write operations according to exemplary embodiments.

Figure 8:
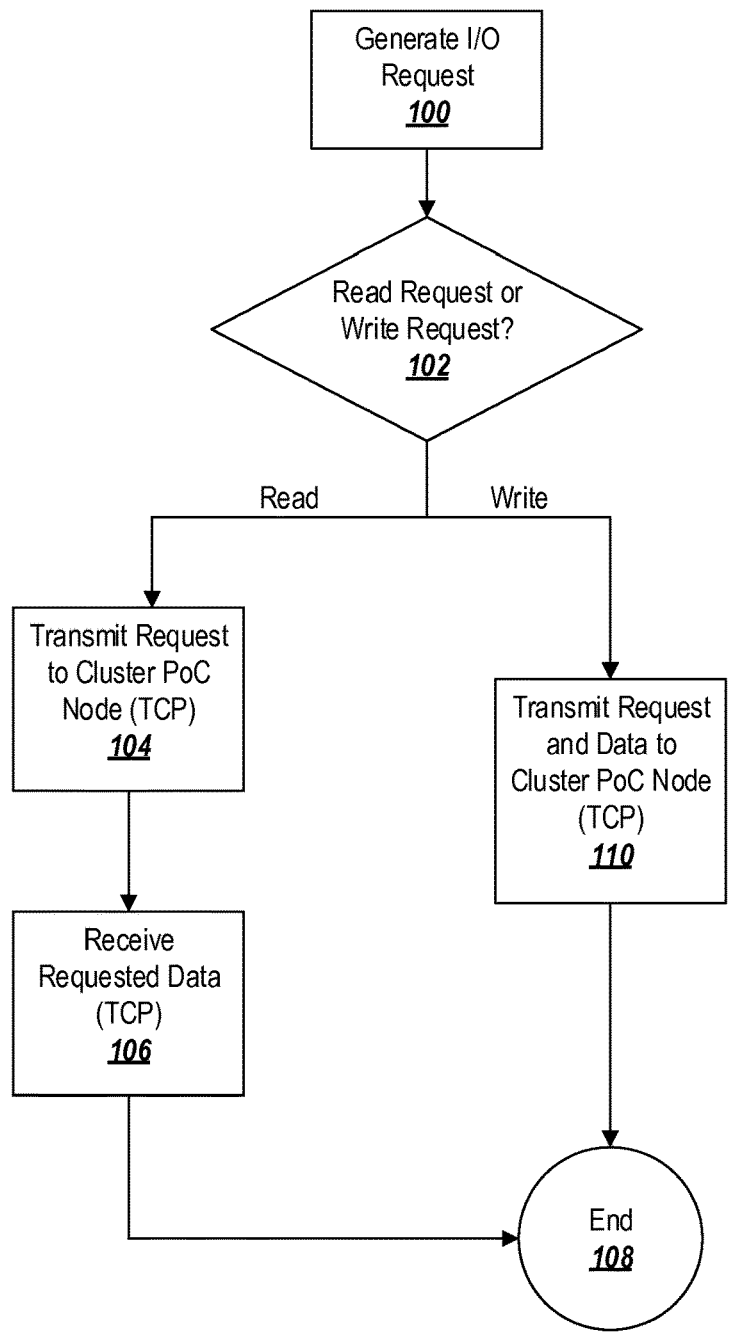
FIG. 8 is a flowchart depicting an exemplary method performed by a client device to request that a cluster perform an I/O operation.

FIG. 8 depicts an exemplary method performed by a client for requesting that the cluster perform read and write operations. The method begins at step 100, in which the client 20 generates an I/O request that instructs the cluster 10 to perform a read operation or a write operation, as determined by the client at step 102.

If the operation is a read operation, processing proceeds to step 104 and the client sends an instruction to the point of contact node specifying which data the client is requesting for reading. The request is transmitted using the TCP protocol. Once the request is serviced by the cluster, the point of contact node 12 transmits the requested data to the client 20, and at step 106 the client receives the requested data via TCP. Processing then terminates at step 108.

If the determination at step 102 is that the I/O Request is a write operation, then processing proceeds to step 110. The client 20 constructs a TCP request that encapsulates the data to be written, and transmits the request to the point of contact node 12. After client receives an acknowledgement from the point of contact node 12 that the data has been successfully written to a volume in the cluster, processing proceeds to step 108 and ends.

Figure 9A:
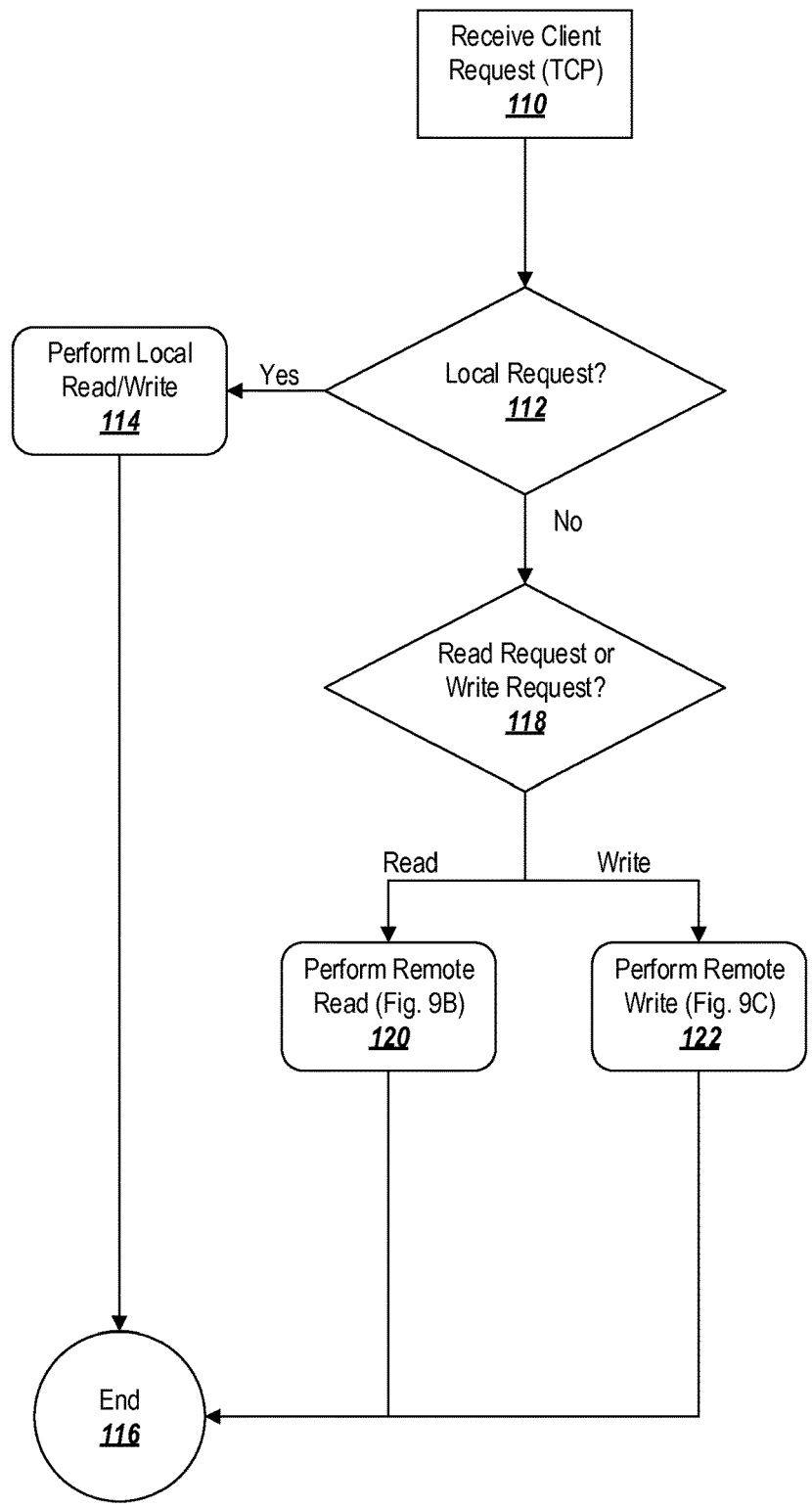
FIGS. 9A-9C are flowcharts depicting an exemplary method performed by a cluster point of contact node to interact with a client requesting an I/O operation and a remote node involved in the I/O operation.

FIG. 9A depicts an exemplary method performed by a point of contact node 12 in the cluster 10. Processing begins at step 110, in which the point of contact node 12 receives a client I/O Request via TCP. At step 112, the point of contact node 12 determines whether the request can be serviced locally (i.e., whether the requested data can be read from or written to a local storage volume 16 associated with the point of contact node 12). If so, then processing proceeds to step 114 and the point of contact node performs a local read or write (e.g., using a method such as the one depicted in FIG. 3A). Processing then terminates at step 116.

If the determination at step 112 is "no" (i.e., the I/O request cannot be handled locally), then processing proceeds to step 118 and the point of contact node 12 determines whether the request is a read request or a write request. The type of request may be specified in the request communication received at step 110. If the request is a read request, then processing proceeds to step 120. If the request is a write request, then processing proceeds to step 122.

Figure 9B:
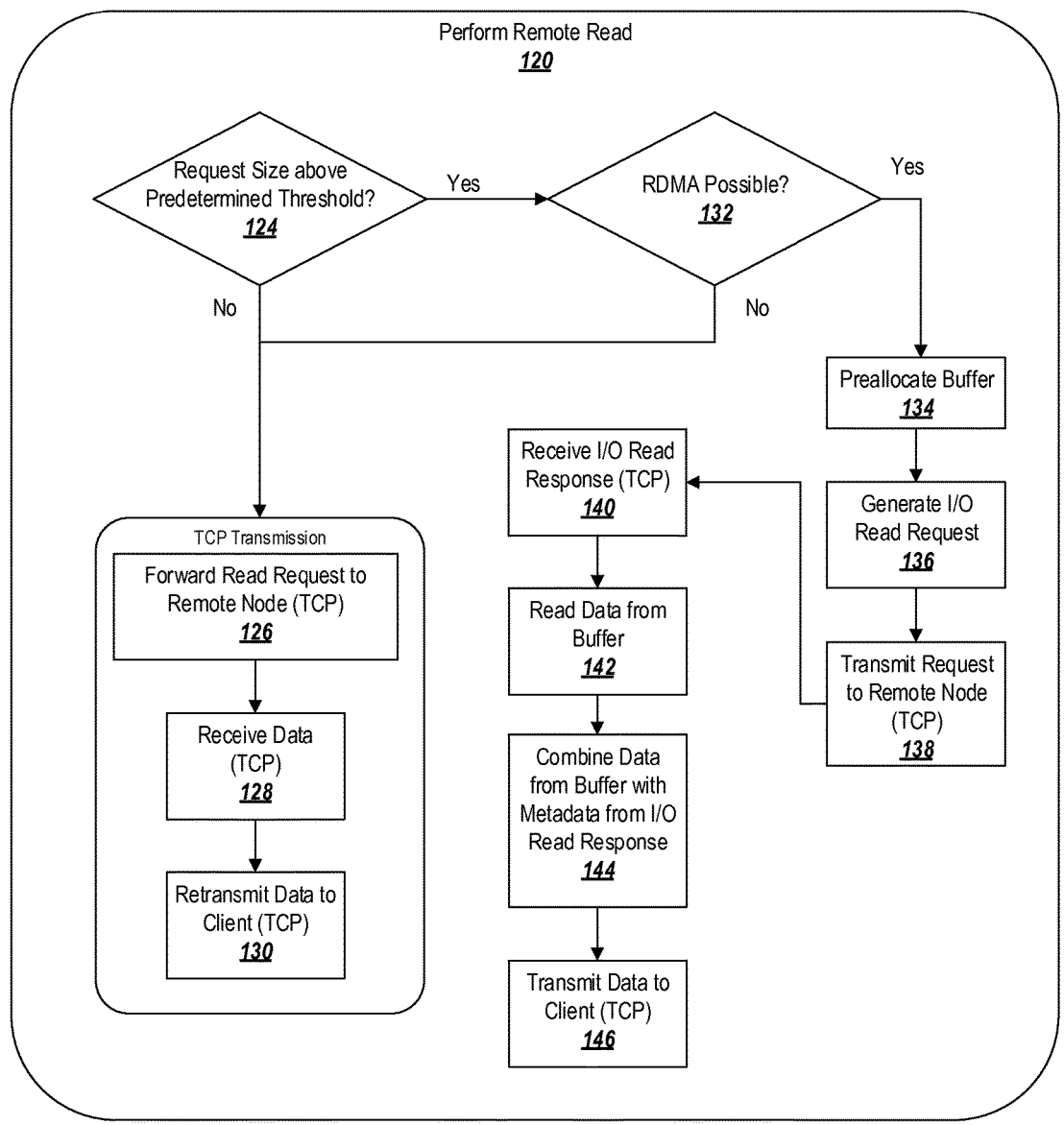

Step 120 is described in more detail with respect to FIG. 9B. Processing first proceeds to step 124, where the point of contact node 12 compares the size of the data to be read to a predetermined threshold amount. For example, the size of the data to be read may be specified in the request received by the point of contact node 12 at step 110, or the point of contact node 12 may maintain a directory indicating the size of files stored on the cluster. The determination made at step 124 is used to evaluate whether to perform the request using RDMA or TCP. The amount of network overhead that is saved by using RDMA as compared to TCP is dependent on how many times the point of contact node 12 can avoid traversing the full network stack (which is itself dependent on number of packets to be transmitted as defined by the size of the requested data compared to the network's MTU size). The amount of overhead incurred (and memory resources used) by allocating buffers for an RDMA transfer must also be considered. Accordingly, the predetermined threshold is set at a level that balances these considerations, to ensure that relatively small requests continue to be handled via TCP, whereas relatively large requests are handled by RDMA. The present inventors have achieved throughput savings of about 30% by employing an RDMA transfer for data as small as 32 kB. Throughput is improved, though to a smaller degree, with a threshold set at 16 kB. Accordingly, in an exemplary embodiment, the predetermined threshold is set to about 16 kB.'

If the determination at step 124 is "no" (i.e., the request size is not larger than the predetermined threshold), then processing proceeds to step 126 and the request is handled via TCP. At step 126, the read request is forwarded to the remote node on which the data resides, and the data is received via TCP at step 128. At step 130, the data is returned to the client via TCP.

If, on the other hand, the determination at step 124 is "yes" (i.e., the request size is larger than the predetermined threshold), then processing proceeds to step 132 and the point of contact node 12 evaluates whether it is possible to communicate with the remote node 14 using RDMA. It may be the case, for example, that the remote node does not support RDMA, or that the remote node does support RDMA but the RDMA communication path (see FIG. 7) is currently constrained. If the determination at step 132 is "no," then processing proceeds to step 126 and the read request is handled using TCP.

If the determination at step 132 is "yes" (i.e., the use of RDMA is possible), then processing proceeds to step 134. At step 134, the point of contact node preallocates a buffer 36 at a location in its memory 34. The buffer 36 may be preallocated at a size depending on the size of the data to be read, as identified in step 124.

At step 136, the point of contact node 12 generates an I/O Read Request 62 and stores the location of the buffer 36 in the PoC Node Buffer Location field 66. The point of contact node 12 also loads an identifier for the requested data (e.g., an identifier as specified in the original request from the client 20, or an internal identifier used by the cluster 10) into the requested data ID field 68. The point of contact node 12 then transmits the I/O Read Request 62 to the remote node using TCP at step 138 and awaits a response.

At step 140, the point of contact node 12 receives an I/O Read Response 70 from the remote node 14 via TCP. At step 142, the point of contact node 12 retrieves the content of the requested data from the buffer allocated at step 134. At step 144, the point of contact node 12 retrieves the metadata associated with the data from the Read Response Header 72 of the I/O Read Response 70, and combines the content with the metadata. Processing then proceeds to step 146, where the point of contact node 12 transmits the requested data to the client 20 via TCP.

Optionally, if an error occurs at step 140 such that the read operation failed, the point of contact node 12 may retry the operation using TCP (step 126).

This concludes the requested read operation.

If the requested operation was a write operation, then processing proceeds from step 118 to 122. Step 122 is described in more detail with respect to FIG. 9C.

Processing begins at step 148, in which the size of the data to be written is compared to a predetermined threshold. The predetermined threshold may be the threshold as previously described in connection with step 124 of FIG. 9B. If the requested size is not above the predetermined threshold, then processing proceeds to step 150 and the write request is handled using TCP. Otherwise, processing proceeds to step 152, where it is determined whether an RDMA transfer is possible. Step 152 may be carried out in the same manner as step 132 from FIG. 9B. If not, processing proceeds to step 150 and the write request is handled using TCP.

If the determination at steps 148 and 152 are both "yes," then processing proceeds to step 154. The point of contact node 12 preallocates a buffer 36 in the memory 34 of the point of contact node 12 for holding the data to be written. At step 156, the point of contact node 12 separates the data into content and metadata, and loads the content of the data into the buffer.

At step 158, the point of contact node 12 generates an I/O Write Request 74 and loads the location of the buffer 36 into PoC Node Buffer Location field 78 of the RDMA Header 76. The metadata from the data is loaded into the metadata field 80. At step 160, the point of contact node 12 transmits the I/O Write Request to the remote node 14 via TCP and awaits a response.

At step 162, the point of contact node receives an I/O Write Response 82 via TCP, and checks the success flag 84 to ensure that the data has been successfully written. If the data has not been successfully written, the point of contact node may retry the write operation using TCP (step 150).

If the data has been successfully written, then processing proceeds to step 164, where the point of contact node deallocates the buffer 36. The point of contact node 12 then transmits an acknowledgement of a successful write operation to the client 20 at step 168.

Figure 9C:
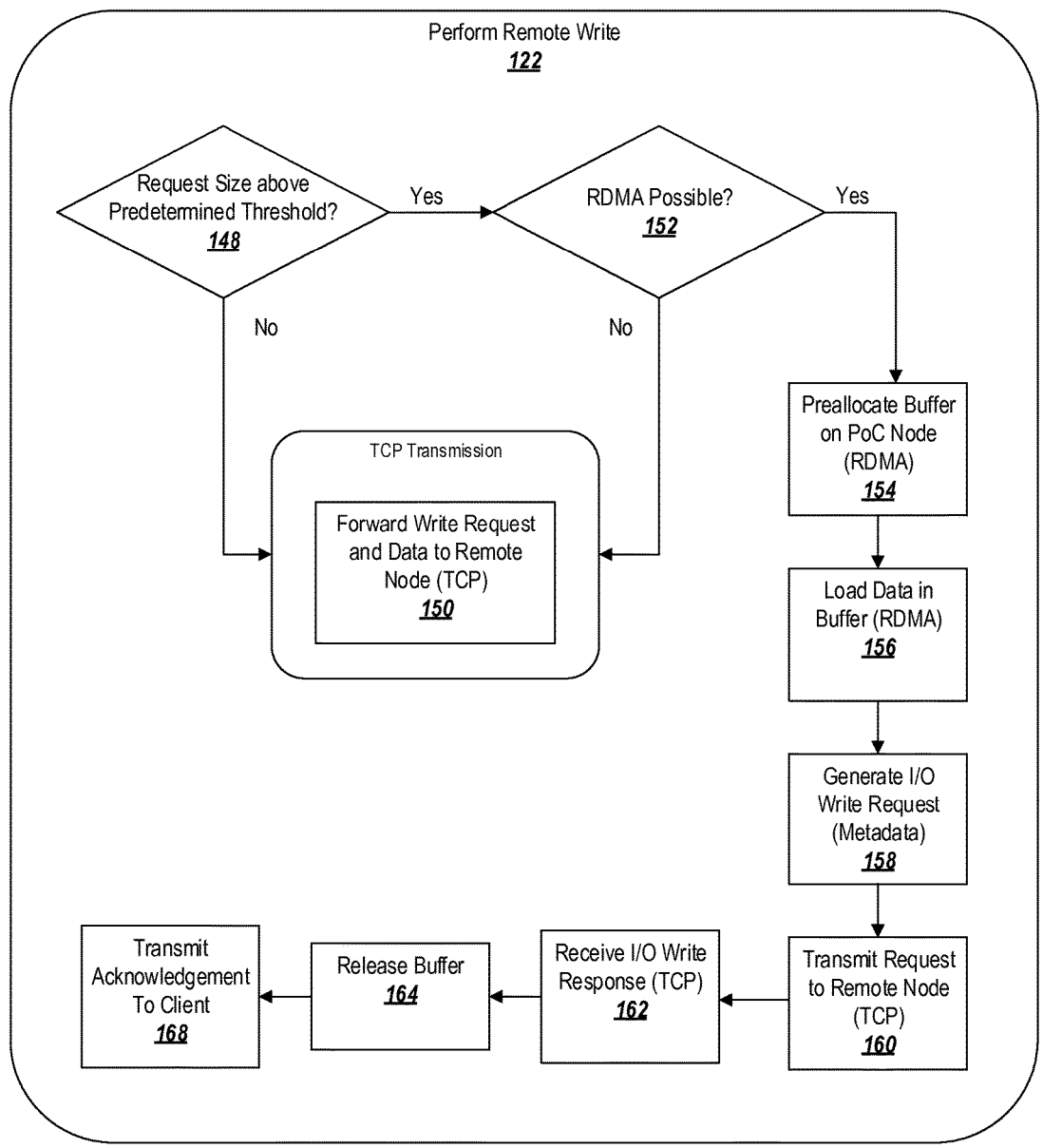
Figures 10A, 10B:
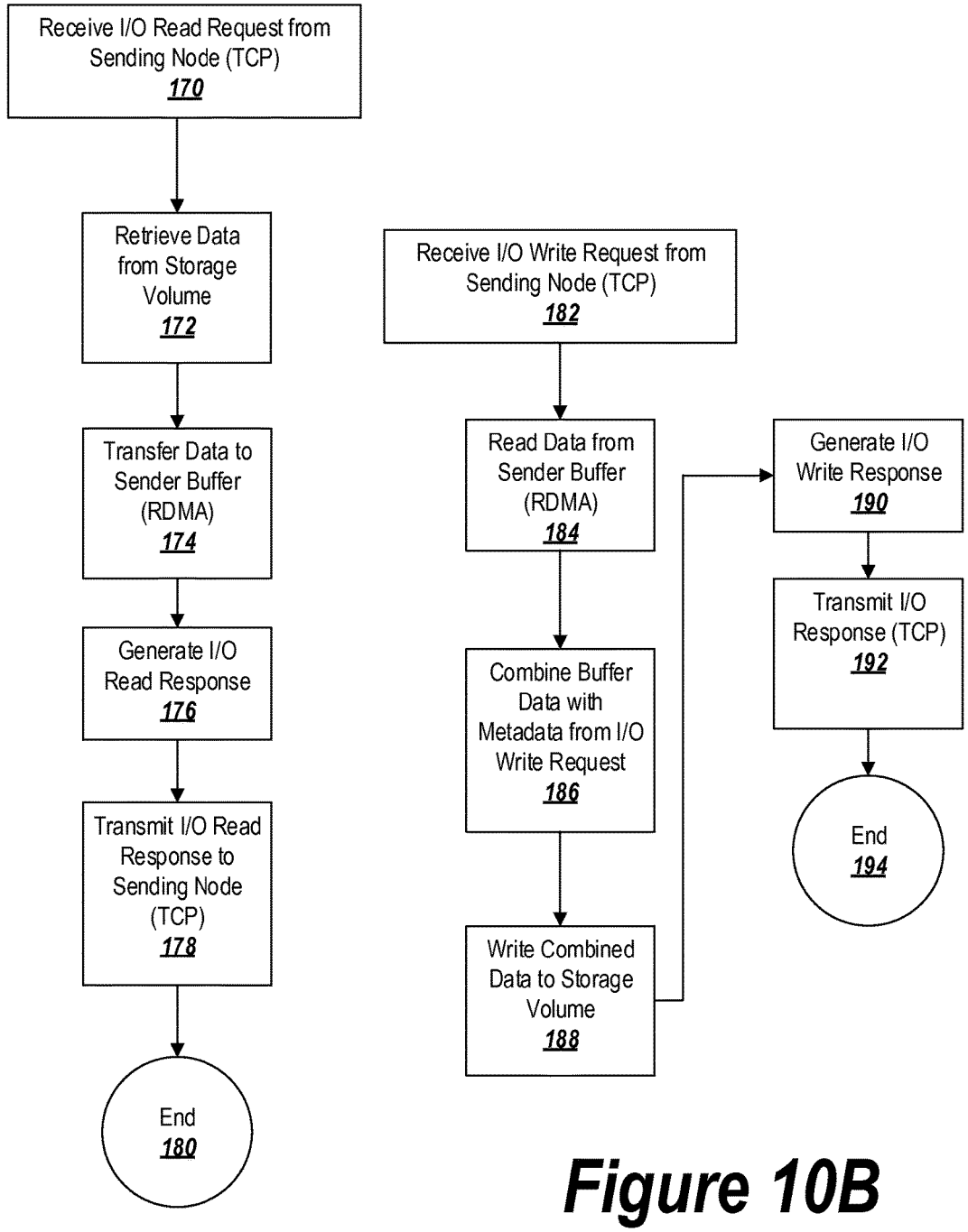
FIGS. 10A-10B are flowcharts depicting exemplary methods performed by a cluster remote node to interact with a sending node requesting an I/O operation.

FIGS. 10A and 10B describe operations performed by the remote node 14 in response to the operations described in FIGS. 9B, and 9C, respectively. FIG. 10A depicts a remote node read method, while FIG. 10B depicts a remote node write method.

In the read operation performed by the remote node 14, processing begins at step 170 when the remote node 14 receives an I/O Read Request 62 via TCP. The remote node reads the PoC Buffer Location field 66 to retrieve the location of the buffer 36 on the point of contact node 12 which is intended to store the data.

At step 172, the remote node 14 retrieves the Requested Data ID 68 from the I/O Read Request 62 and reads the corresponding data 42 from the volume 18 associated with the remote node 14. The remote node 14 divides the data 42 into content and metadata. At step 174, the remote node 14 issues an RDMA write command to write the retrieved content into the point of contact node 12 buffer 36 at the location identified in step 170.

Once the data has been transferred via RDMA, the remote node 14 generates an I/O Read Response 70 by loading the metadata into the Read Response Header 72 at step 176. At step 178, the remote node transmits the I/O Read Response 70 to the point of contact node 12 via TCP. Processing then terminates at step 180.

In the write operation performed by the remote node 14, processing begins at step 182 when the remote node 14 receives an I/O Write Request 74 via TCP. The remote node 14 reads the PoC Buffer Location field 78 to retrieve the location of the buffer 36 on the point of contact node 12 which is storing the content for the data that is intended to be written. The remote node also retrieves the metadata for the data from the metadata field 80 of the I/O Write Request 74.

At step 184, the remote node 14 issues an RDMA read command to read the content of the data from the buffer 36 of the point of contact node 12. At step 186, the content is combined with the metadata retrieved at step 182 to recreate the data to be written.

At step 188, the remote node 14 performs a local write operation to write the combined data to the storage volume 18 associated with the remote node 14. Depending on whether the write is successful, the remote node 14 generates an I/O Write Response Message 82 with the Success Flag in the Write Response Header 84 set to the appropriate value. At step 192, the remote node 14 transmits the I/O Write Response 82 to the point of contact node 12 via TCP. Processing then proceeds to step 194 and terminates.

Although exemplary embodiments have been described with reference to specific examples, one of ordinary skill in the art will recognize that the present invention is not so limited. Alternative embodiments may employ more, fewer, or different components than the apparatuses and systems described herein. Alternative embodiments may also employ more, fewer, or different steps than the methods described herein, and may carry out steps in a different order than described. Moreover, although exemplary embodiments involve direct communication between the point of contact node 12 and the remote node 14, it is understood that the communication may occur through one or more intervening nodes, which may also employ RDMA to improve network throughput.

The invention claimed is:

1. A method comprising:
    receiving, via a transport control protocol (TCP) by a first node, a read request from a client device to read data, comprising metadata and content, that is stored on a remote volume associated with a second node content;
    allocating, by the first node, a buffer within memory of the first node for receiving the content using remote direct memory access (RDMA) based upon a size of the content exceeding a size threshold and resource consumption for allocating the buffer being below a threshold;
    transmitting an address of the buffer to the second node via the TCP to trigger the second node to perform an RDMA write operation to write the content into the buffer using the address;
    receiving, via the TCP by the first node from the second node, the metadata comprising instructions for reconstructing the data using the content within the buffer, wherein a response header comprises an indication of whether the RDMA write operation was successful; and
    reconstructing and transmitting the data to the client device using the metadata and the content based upon the instructions.

2. The method of claim 1, comprising:
    deallocating the buffer from the memory based upon transmitting the data to the client device.

3. The method of claim 1, further comprising:
    extract the content from the buffer based upon the flag indicating that the RDMA write operation by the second node wrote the content into the buffer within the memory of the first node.

4. The method of claim 1, wherein the reconstructing comprises:
    combining the metadata received via the TCP and the content received through the buffer via the RDMA to construct the data.

5. The method of claim 1, further comprising:
    receiving the content via TCP as opposed to the RDMA when the size of the content is less than the size threshold.

6. The method of claim 1, wherein the size threshold is between about 16 kilobytes and about 32 kilobytes.

7. The method of claim 1, further comprising:
    reverting to data transmission via the TCP when communication via the RDMA is impossible.

8. The method of claim 1, wherein the RDMA write operation is performed by the second node to facilitate execution of the read request by the first node.

9. A non-transitory computer readable medium storing instructions that, when executed, cause circuitry of a computing device to:
    receive, via a transport control protocol (TCP) by a first node, a read request from a client device to read data, comprising metadata and content, that is stored on a remote volume associated with a second node;

allocate, by the first node, a buffer within memory of the first node for receiving the content using remote direct memory access (RDMA) based upon a size of the content exceeding a size threshold and resource consumption for allocating the buffer being below a threshold;

transmit an address of the buffer to the second node using the TCP to trigger the second node to perform an RDMA write operation to write the content into the buffer using the address;

receive, via the TCP by the first node from the second node, the metadata comprising instructions for reconstructing the data using the content within the buffer, wherein a response header comprises an indication of whether the RDMA write operation was successful; and reconstruct and transmit the data to the client device using the metadata and the content based upon the instructions.

10. The medium of claim 9, wherein the instructions cause the computing device:

deallocate the buffer from the memory based upon transmitting the data to the client device.

11. The medium of claim 9, wherein the instructions cause the computing device to:

extract the content from the buffer based upon the flag indicating that the RDMA write operation by the second node wrote the content into the buffer within the memory of the first node.

12. The medium of claim 9, wherein the instructions cause the computing device:

combine the metadata received via the TCP and the content received through the buffer via the RDMA to construct the data.

13. The medium of claim 9, wherein the instructions cause the computing device:

receiving the content via TCP as opposed to the RDMA when the size of the content is less than the size threshold.

14. The medium of claim 9, wherein the instructions cause the computing device:

revert to data transmission via the TCP when communication via the RDMA is impossible.

15. The medium of claim 9, wherein the RDMA write operation is performed by the second node to facilitate execution of the read request by the first node.

16. A computing device, comprising:

a memory comprising machine executable code; and a processor coupled to the memory, the processor configured to execute the machine executable code to cause the processor to:

receive, via a transport control protocol (TCP) by a first node, a read request from a client device to read data, comprising metadata and content, that is stored on a remote volume associated with a second node;

allocate, by the first node, a buffer within memory of the first node for receiving the content using remote direct memory access (RDMA) based upon a size of the content exceeding a size threshold and resource consumption for allocating the buffer being below a threshold;

transmit an address of the buffer to the second node using the TCP to trigger the second node to perform an RDMA write operation to write the content into the buffer using the address;

receive, via the TCP by the first node from the second node, the metadata comprising instructions for reconstructing the data using the content within the buffer, wherein a response header comprises an indication of whether the RDMA write operation was successful; and reconstruct and transmit the data to the client device using the metadata and the content based upon the instructions.

17. The computing device of claim 16, wherein the buffer is deallocated from the memory based upon transmitting the data to the client device.

18. The computing device of claim 16, wherein the content is transmitted via the TCP when the size of the content is less than the size threshold.

19. The computing device of claim 18, wherein the size threshold is between about 16 kilobytes and about 32 kilobytes.

20. The computing device of claim 16, wherein the machine executable code causes the processor to revert to data transmission via the TCP when communication via the RDMA is impossible.

* * * * *